United States Patent [19]

Yaita et al.

[11] Patent Number: 4,758,394
[45] Date of Patent: Jul. 19, 1988

[54] METHOD OF AND APPARATUS FOR FORMING CUPS OF EXPANDED RESIN

[75] Inventors: Masato Yaita; Toshikazu Omori, both of Koga; Takao Suzuki, Urawa; Hiroshi Hasegawa, Sowa, all of Japan

[73] Assignee: Sekisui Kaseihin Kogyo Kabushiki Kaisha, Nara, Japan

[21] Appl. No.: 914,952

[22] Filed: Oct. 3, 1986

[30] Foreign Application Priority Data

Oct. 3, 1985 [JP] Japan .................. 60-220732
Aug. 11, 1986 [JP] Japan .................. 61-188292

[51] Int. Cl.$^4$ .................. C08J 9/22; B29C 67/22; B29C 43/56
[52] U.S. Cl. .................. 264/51; 264/321; 264/337; 264/531; 264/573; 264/DIG. 66; 425/4 R; 425/342.1; 425/384; 425/398
[58] Field of Search .................. 264/53, 51, 321, 531, 264/573, DIG. 66, 337; 425/4 R, 384, 398, 342.1

[56] References Cited

U.S. PATENT DOCUMENTS 3,897,899  8/1975  Schuff et al. .................. 264/51 X
4,106,884  8/1978  Jegelka .................. 425/4 R X
4,260,571  4/1981  Ritter .................. 264/53

FOREIGN PATENT DOCUMENTS 56-98149  8/1981  Japan .
60-90335  9/1985  Japan .

Primary Examiner—Philip Anderson
Attorney, Agent, or Firm—Armstrong, Nikaido, Marmelstein & Kubovcik

[57] ABSTRACT

Forming method of producing thin-walled finished articles such as cups of expanded resin including steps of: heating beads of expandable thermoplastic resin in a mold cavity of a preforming mold, causing the beads to be expanded and fused together to produce a preformed article; transferring the preformed article as pressurized in an atmosphere under pressure to a finish-forming mold; and compressively forming the preformed article with the finish-forming mold. Also, disclosed in apparatus to be used for embodying the method of forming expanded resin cups, including: a pressure chamber held as pressurized, a preforming mold in which beads of expandable thermoplastic resin introduced in the mold cavity are heated, causing the beads to be expanded and fused together to produce a preformed article; male member transferring means for transferring the male member of the preforming mold together with the preformed article, to a position opposite to the female member of a finish-forming mold; and a finish-forming mold for heating, compressively forming, and cooling the preformed article to produce a thin-walled finished article, with the preforming mold and the finish-forming mold being both disposed in the pressurized chamber.

8 Claims, 11 Drawing Sheets

Fig. 2
Fig. 3
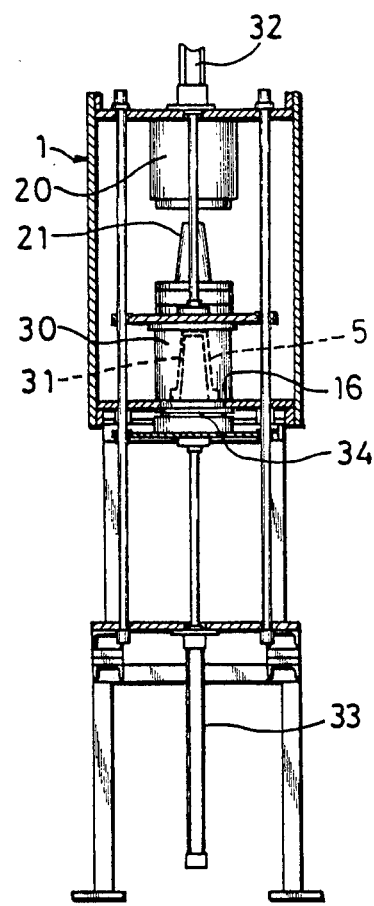
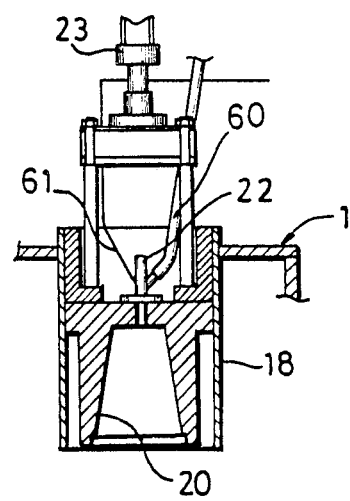

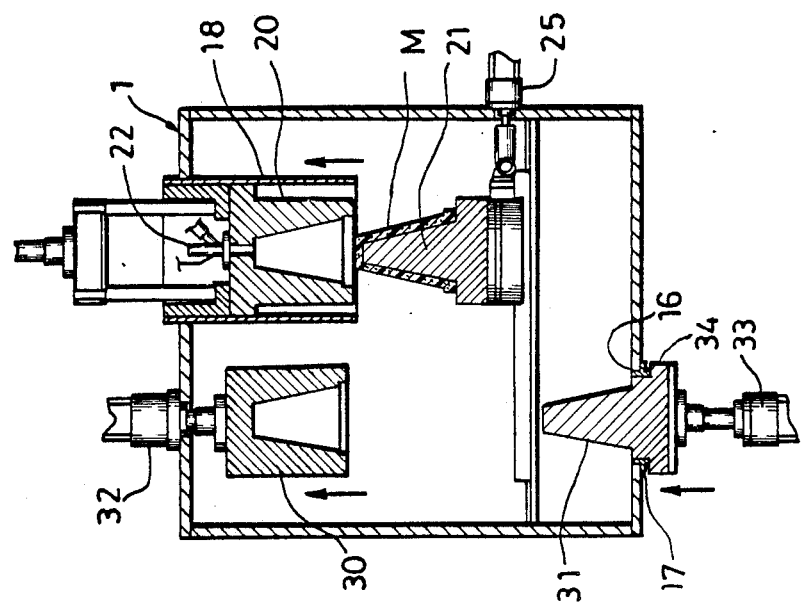
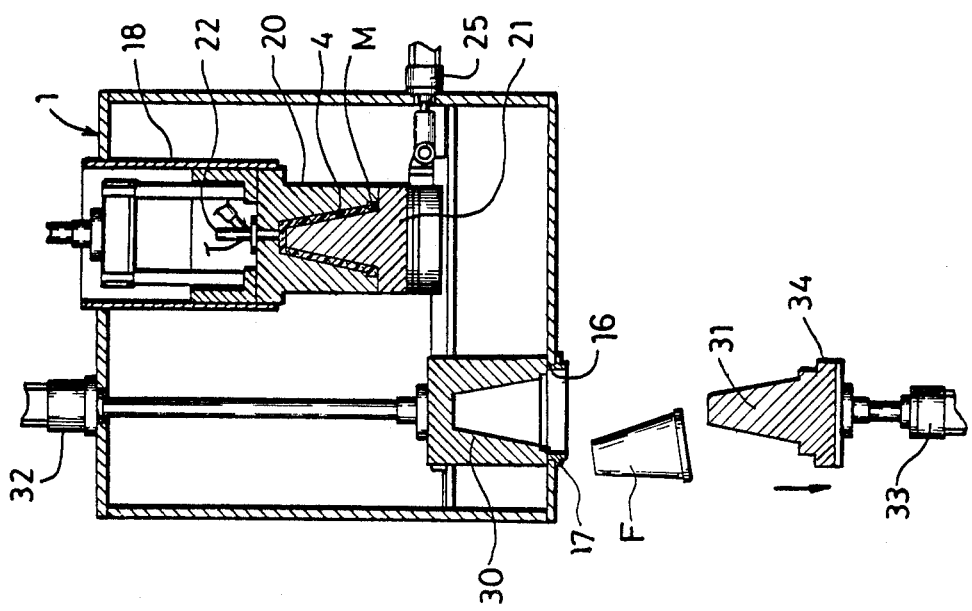

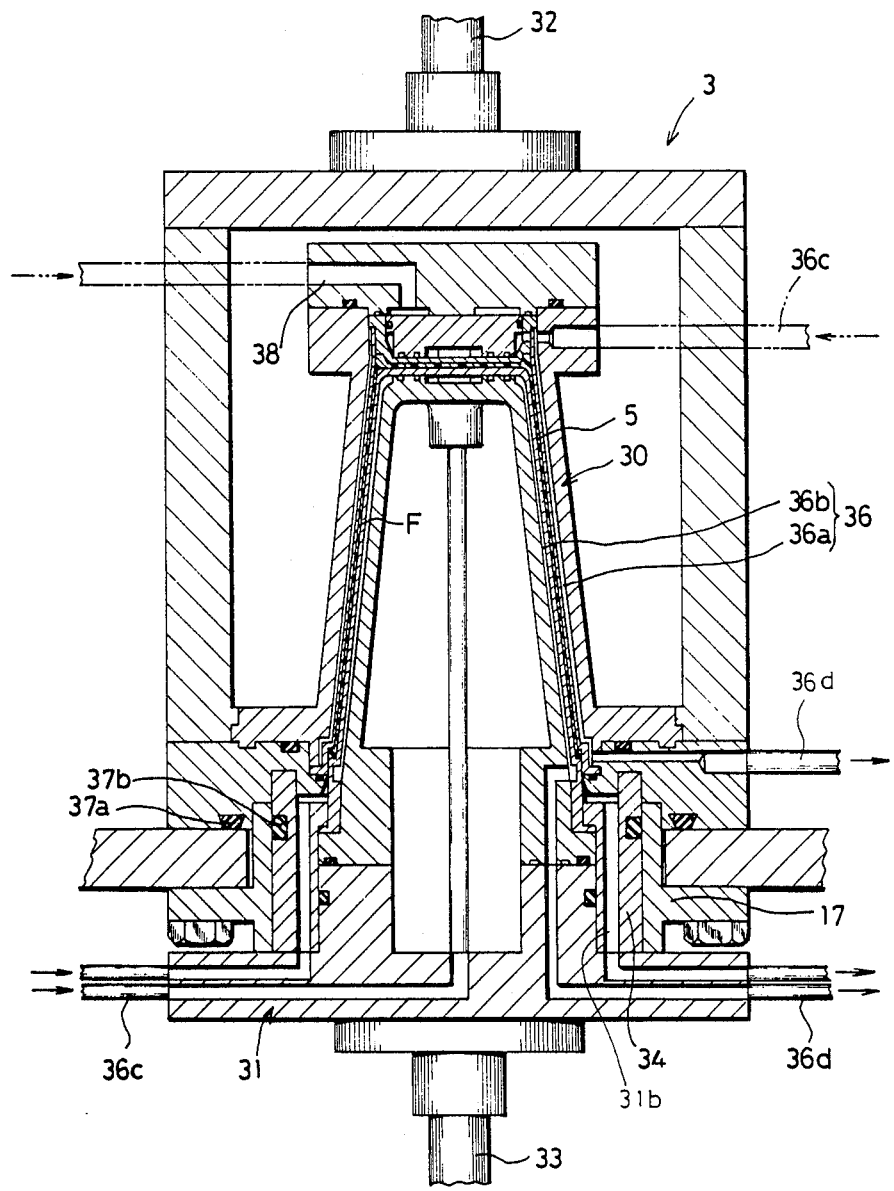

METHOD OF AND APPARATUS FOR FORMING CUPS OF EXPANDED RESIN

BACKGROUND OF THE INVENTION

The present invention relates to a method of and apparatus for forming thin-walled cups of expanded resin.

There is known a method of forming cups of an expanded material by filling the mold cavity with beads of expandable thermoplastic resin, heating the beads to be expanded and fused into a solid piece and cooling the same. In such method, there are used beads of expandable thermoplastic resin which have been pre-expanded to a predetermined size. After introduced into the mold cavity defined by a pair of female and male members of a mold, the beads are expanded and fused together. The mold cavity should therefore have a space having a sufficient width to allow the beads to pass through and be introduced in the mold cavity. When the mold cavity is filled with the beads, there are produced gaps between the beads due to their spherical shape. In order to assure water-tightness for a cup, it is required to fill up these gaps completely by the expansion and swelling of the beads to make the article compactly formed on the whole, leaving no gaps therein.

In this connection, the mold cavity should be defined so as to have throughout a spatial width more than a predetermined size. This results in the production of expansion-formed articles or cups having a wall thickness more than a predetermined thickness value, since the wall thickness corresponds to the spatial width of the mold cavity.

However, it has become necessary to manufacture thin-walled formed articles dependent on the shapes or applications required. Conventional forming methods could not meet such demand.

For example, when manufacturing slender and deep cylindrical cups to be used for drink, it was difficult to form cups with a wall thickness less than 1 mm by a conventional bead forming method, since the mold cavity requires a spatial thickness of at least 1 mm. That is, in order to produce a good formed article having no defects such as pinholes by the bead forming method, beads should be introduced so that at least two beads are arranged in the thickness direction (U.S. Pat. No. 3,897,899) and the beads as arranged in such state should be expanded and fused together. However, the diameter of each of expandable beads available to be generally used is about 0.6 mm, even for that having a relatively high density of 0.4 g/cm$^3$. When carrying out expansion forming with the mold cavity of a mold filled with such large beads, two or more beads cannot be arranged in the widthwise direction of the mold cavity having a spatial width of 1 mm or less. Accordingly, when a cup with a wall thickness of 1 mm or less is made according to a conventional bead forming method, the wall inevitably contains pinholes or gaps to provoke a water leak or to lower the water-tightness. Moreover, the mutual fusion of the beads is weak, resulting in reducing strength of the finished article.

On the other hand, the wall thickness of such cups affects a so-called stacking height or the height of cups stacked as fitted in one another. The thinner the wall thickness, the lower the stacking height to improve the housing efficiency in storage and transportation of the cups. Accordingly, it has been long desired to produce cups with a wall thickness less than 1 mm which exceeds the forming limit in the conventional bead forming.

In order to meet such demand, there has been proposed a forming method comprising a step of heating beads to cause the same to be expanded and fused together, thereby to produce a formed article in the form of a cup having a thick wall, and reducing the wall thickness of the formed article by mechanically pushing the formed article or exerting a pneumatic pressure to the formed article from the inside of the mold male member (For example, Japanese Patent Publication No. 8744/1973).

However, when a pneumatic pressure is used in this method, it is difficult to exert such pneumatic pressure uniformly to the formed article in the form of a cup. This results in the occurrence of minute irregularities on the thin-walled portion to disadvantageously lower the uniform thickness accuracy. When the article is to be mechanically pushed, the mold has to be partially moved. This would inevitably complicate the mold structure and the actuating mechanism, thus inducing increase in the mold manufacturing cost and complication of the forming process. Further, when a portion, for example the peripheral side wall, of a formed article of a cup is reduced in thickness by compression, excessive force is exerted to the boundary between the bottom and the peripheral side wall. It is therefore difficult to produce a formed article or cup well balanced from the view of the totality of the formed article. According to this method, further, the same mold is submitted to the heating step after the introduction of beads and the subsequent cooling step. This results in a considerable loss of heating and cooling energies and disadvantageously takes more time for the forming cycle.

In order to meet the demand mentioned earlier, there has been also proposed a method according to which the mold cavity of a mold is defined so as to have a relatively large spatial width at the time of bead introducing process or the heating process, and thereafter the mold is partially moved to compress, for example, the peripheral side wall of a preformed cup, thereby to reduce the wall thickness. (For example, Japanese Patent Laid-Open Publication No. 142668/1975). However, this method also presents a drawback similar to that discussed in connection with the mechanical pushing in the method mentioned earlier.

In expansion forming of not only cups but also general articles, one mold is repeatedly submitted to the bead introducing process, the heating process and the cooling process in succession. This disadvantageously incurs a loss of both heating and cooling energies and takes too much time for the forming cycle.

In order to eliminate such energy loss and to shorten the cycle time, there has been proposed a forming method according to which there are used two molds, i.e. a mold for heating process and a mold for cooling process, and an article formed with the mold for heating process is transferred to the mold for cooling process. (For example, U.S. Pat. No. 4,106,884).

According to this forming method, however, a formed article after heat-forming is transferred under atmospheric pressure, allowing the formed article to expand so that such article undergoes a considerable change in wall thickness. Therefore, this forming method is not suitable to the production of the thin-walled slender and deep cylindrical cups mentioned earlier, but can be merely applied to the production of formed articles for which strict accuracy on the dimensions are not required.

As another forming method using the transfer system, there has been proposed a method according to which, in order to leave no minute gaps between the fusion-bonded beads, a first mold filled with beads is submitted to a heating process to expand the beads, after which the same first mold is submitted to a cooling process such that a resultant formed article won't be deformed even if released from the first mold under atmospheric pressure. The formed article is then released from the first mold and transferred to a second mold under atmospheric pressure. While heated and melted, only the surface of the formed article is compressed in the second mold, and other portions of the formed article are cooled simultaneously with or prior to the compression. (For example, Japanese Patent Laid-Open Publication No. 190335/1985). According to this method, only the surface of the formed article is compressed while heated and melted, and other portions are merely cooled. This would produce a hard resin layer on the surface, but the entire formed article or cup is difficult to compress whereby the wall thickness cannot be readily reduced. Likewise in normal forming, the first mold is submitted to both the heating process and the cooling process. Therefore, this method does not contribute to elimination of the energy loss and reduction in the forming cycle time.

In order to eliminate a loss of energy and shorten the forming cycle time, there have been proposed two methods. According to one method, a formed article is transferred from a heating mold to a cooling mold in a controlled atmosphere, instead of under atmospheric pressure, in order to restrain deformation due to the expanding force of the formed article (For example, Japanese Patent Laid-Open Publication No. 98149/1981). According to the other method, a preformed article formed to a predetermined configuration is transferred from a heating mold to a cooling mold in a state allowing the preformed article to freely expand (For example, U.S. Pat. No. 4,260,571).

However, these methods merely deal with the transfer of a formed article from the heating step to the cooling step either in a controlled atmosphere or in such atmosphere as to allow the formed article to be freely expanded, but do not include a step of compressing the formed article or cup to reduce the wall thickness thereof.

Instead of such bead forming, there has been also used a so-called sheet forming method in order to produce thin-walled formed articles. According to the sheet forming, after heated and softened, an expanded sheet preliminarily extruded is raised and deformed along the mold into a predetermined configuration. According to such sheet forming, however, it is difficult to form deep cups having a greatly raised configuration such as cups for drink, since the sheet cannot be sufficiently oriented. Further, a finished article is made from a single sheet. It is therefore difficult to form a finished article partially thickened for the purpose of reinforcement. Moreover, restrictions are imposed on the structure of a sheet forming mold, thus bringing limitations to the configuration of a formed article to be obtained.

It has been therefore long desired to manufacture thin-walled formed articles in a short period of time with a loss of energy minimized, according to the bead forming method having various advantages as compared to the sheet forming method.

SUMMARY OF THE INVENTION

It is an object of the invention to provide a bead forming method capable of forming thin-walled cups of expanded resin in a short period of time with a loss of energy minimized.

It is another object of the invention to provide a forming apparatus to be suitably used for carrying out the forming method above-mentioned.

In order to achieve the above objects, the method of forming cups of expanded resin comprises steps of heating beads of expandable thermoplastic resin in a mold cavity of a preforming mold to cause the beads to be expanded and fused together to produce a preformed article, transferring the preformed article to a finish-forming mold, and carrying out predetermined finishing treatment on the preformed article in the finish-forming mold to produce a finished article, the preforming mold and the finish-forming mold being disposed in a pressure chamber held as pressurized, and this method is characterized by a step of forming a preformed article thicker than a finished article with the preforming mold, transferring the preformed article to the finish-forming mold, and compressively forming the preformed article in the finish-forming mold to reduce the thickness of the preformed article, thereby to produce a thin-walled finished article.

In order to achieve the above-mentioned objects, the apparatus for forming cups of expanded resin comprises a pressure chamber held as pressurized, a preforming mold in which beads of expandable thermoplastic resin introduced in the mold cavity are heated, causing the beads to be expanded and fused together to produce a preformed article, and a finish-forming mold in which predetermined finishing treatment is carried out on the preformed article, the both molds being disposed in the pressure chamber, and the mold cavity of the preforming mold has a spatial width greater than that of the mold cavity of the finish-forming mold, and there is a disposed male member transferring means for transferring the male member of the preforming mold together with the preformed article, to a position opposite to the female member of the finish-forming mold.

These and other objects of the present invention will be apparent from the following detailed description with reference to the attached drawings.

BRIEF DESCRIPTION OF THE DRAWINGS

FIG. 2 is a side view with portions broken away of the apparatus in FIG. 1;

FIG. 3 is a schematic sectional view of the female member of a preforming mold;

FIGS. 6 to 12 are schematic views illustrating, in succession, the forming steps;

FIG. 16 is an enlarged sectional view illustrating a further example of the finish-forming mold.

DETAILED DESCRIPTION OF THE PREFERRED EMBODIMENTS

The following description will discuss in detail the present invention with reference to the attached drawings illustrating preferred embodiments of the invention.

Figure 1:
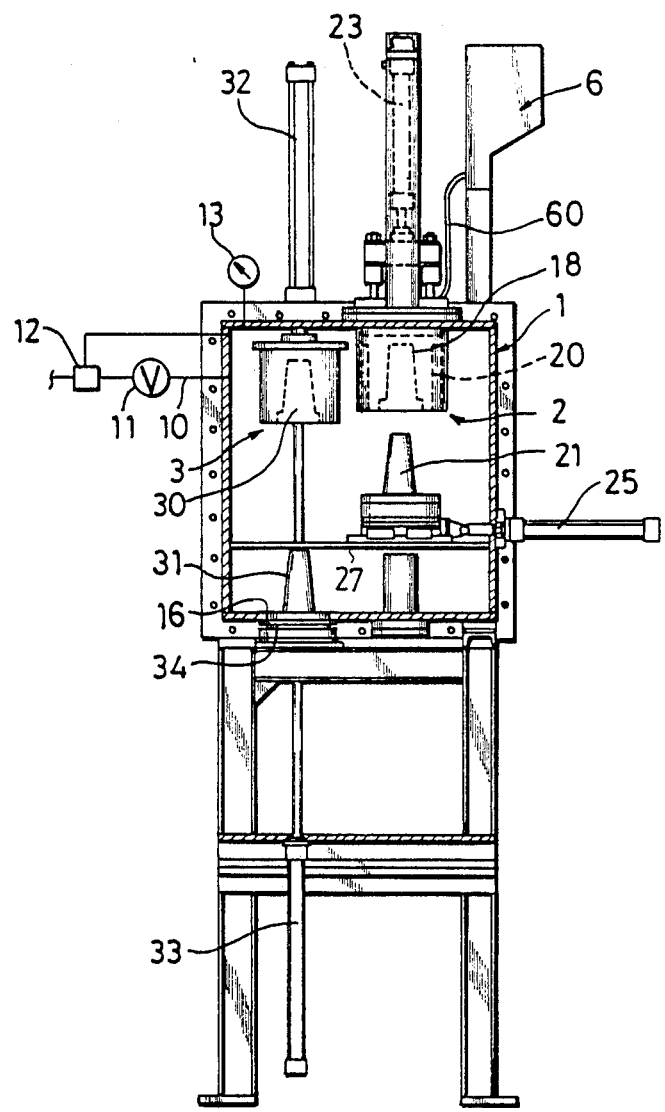
FIG. 1 is a front view, with portions broken away, of a whole forming apparatus in accordance with the present invention.

FIGS. 1 to 3 schematically illustrate forming apparatus to be used for embodying a method of forming cups of expanded resin in accordance with the present invention.

The forming apparatus includes a pressure chamber 1 held as pressurized therein, a preforming mold 2 for producing a preformed article and a finish-forming mold 3 for finish-forming the performed article, the preforming mold 2 and the finish-forming mold 3 being disposed in the pressure chamber 1. In this embodiment, one preforming mold 2 and one finish-forming mold 3 are disposed side by side.

The pressure chamber 1 constitutes an airtight space the interior of which is controlled from the outside. Compressed air introduced into the chamber 1 causes the pressure therein to be maintained higher than atmospheric pressure. An air pipe 10 for introducing compressed air into the pressure chamber 1 is connected to a predetermined portion thereof. Disposed in the middle course of the air pipe 10 are a control valve 11 for controlling the supply of compressed air into the pressure chamber 1 and a pressure regulator 12 for regulating the pressure in the pressure chamber 1. Also disposed outside of the pressure chamber 1 is a pressure gauge 13 for measuring and observing the inner pressure of the pressure chamber 1.

The preforming mold 2 and the finish-forming mold 3 disposed in the pressure chamber 1 are illustrated as those for forming slender cylindrical cups to be used for drink.

Figure 4:
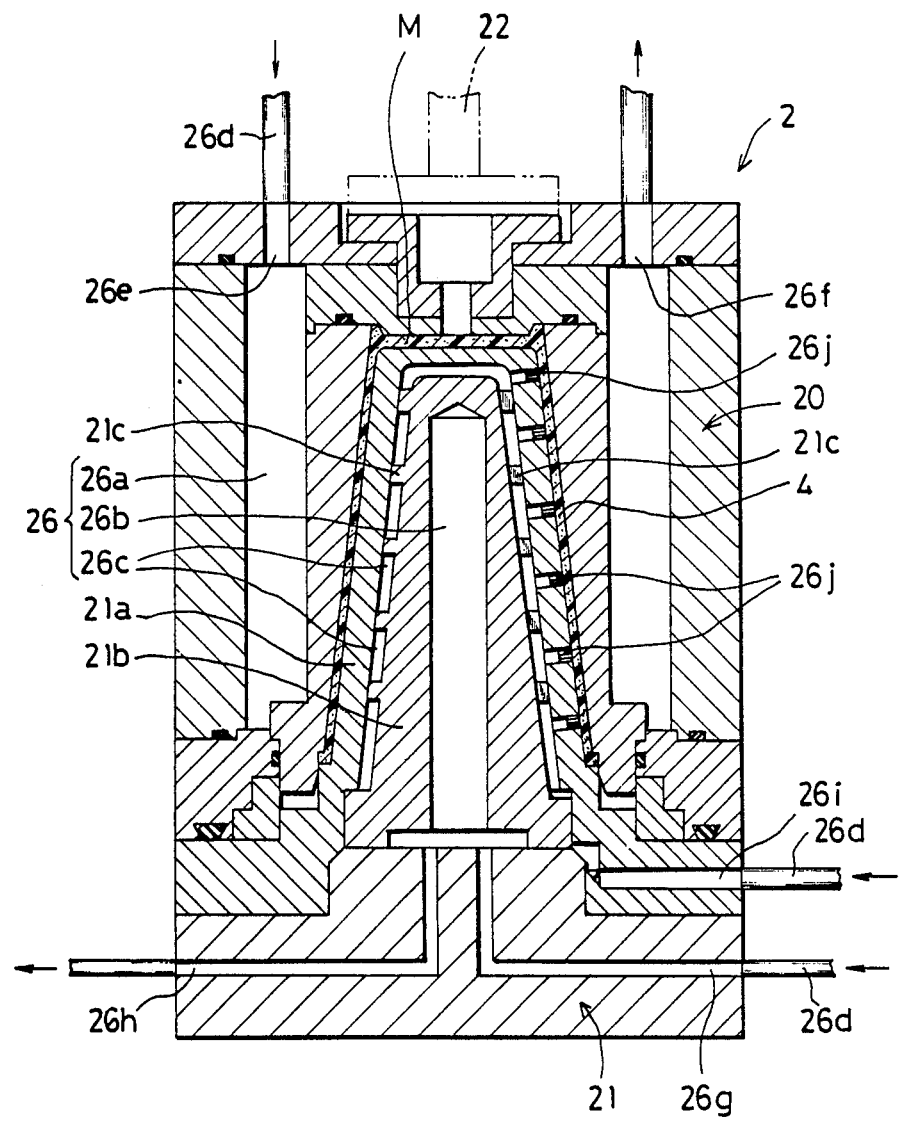
FIG. 4 is an enlarged sectional view of the preforming mold.

In the preforming mold 2, there are disposed a female member 20 and a male member 21 vertically opposite thereto. As shown in FIG. 3, a raw material feeder 22 for introducing beads of expandable thermoplastic resin is disposed on the female member 20. This raw material feeder 22 has a structure similar to that used for a conventional expansion molding. Connected to the raw material feeder 22 are a raw material supply pipe 60 having one end connected to a raw material hopper 6 outside of the pressure chamber 1, and an air pipe 61 for introducing compressed air to be used for introducing the raw material. When the preforming mold 2 is closed by bringing the female member 20 near to the male member 21, a mold cavity 4 is defined between the opposite surfaces of the both members 20 and 21 (FIG. 4). This mold cavity 4 is filled with the raw material in the form of resin beads by the device 22. The mold cavity 4 is defined such that the spatial thickness thereof is greater than the thickness of a resin cup which is sought to be finally obtained.

As to the mold surface facing to the inside of the pressure chamber 1, the female member 20 is vertically slidable as closely fitted in a guide casing 18 which passes through the ceiling wall of the pressure chamber 1. The female member 20 may be vertically moved along the guide casing 18 by a cylinder 23 above the female member 20. The vertical movement of the female member 20 enables the preforming mold 2 to be alternately opened and closed. In such vertical movement of the female member 20, the outer periphery thereof is always in close contact with the guide casing 18. Accordingly, there is no possibility of compressed air introduced in the pressure chamber 1, leaking to the outside. In order to enhance the airtightness between the female member 20 and the guide casing 18, it is desired to dispose a sealing member such as an O-ring or packing.

The male member 21 can be horizontally moved by a cylinder 25 as male member transferring means secured to the pressure chamber 1 at the lateral side thereof. The male member 21 can be movingly guided by a guide post 27. The male member 21 can be moved between the position under and opposite to the female member 20 and the center position of the finish-forming mold 3.

The female member 20 and the male member 21 include heating means 26 for heating beads of expandable thermoplastic resin introduced in the mold cavity 4.

As shown in detail in FIG. 4, the heating means 26 includes a first steam chamber 26a in the female member 20, a second steam chamber 26b in the male member 21 at the center thereof, a third steam chamber 26c around the second steam chamber 26b, and steam supply means (not shown) for supplying steam to these steam chambers 26a, 26b, 26c through a steam pipe 26d from the outside of the pressure chamber 1. Steam is always introduced into the first steam chamber 26a through a steam inlet hole 26e. The steam introduced into the first steam chamber 26a heats the female member 20 to predetermined temperature, thereby to heat indirectly the resin beads in the mold cavity 4. The steam introduced into the first steam chamber 26a is discharged through a steam outlet hole 26f. Steam is always introduced into the second steam chamber 26b through a steam inlet hole 26g. The steam introduced into the second steam chamber 26b heats the male member 21 to a predetermined temperature, thereby to heat indirectly the resin beads in the mold cavity 4. The steam introduced into the second steam chamber 26b is discharged through a steam outlet hole 26h. After the mold cavity 4 has been filled with resin beads, steam is introduced into the third steam chamber 26c through a steam inlet hole 26i. The steam thus introduced, is injected to the resin beads introduced in the mold cavity 4, through steam core vents 26j in communication with the third steam chamber 26c and the mold cavity 4. Such steam injected can heat directly the resin beads in the mold cavity 4. The third steam chamber 26c causes the male member 21 to have a double-structure of an outer portion 21a and an inner portion 21b, and is formed by combining these outer and inner portions 21a and 21b with each other with a predetermined gap provided therebetween. The outer portion 21a and/or the inner portion 21b have projections 21c at space intervals for forming a space which serves as the third steam chamber 26c.

The female member 20 and the male member 21 include mold release means using air injection (not shown). The mold release means use air injection to be made from the inside of the female member 20 and the male member 21, thereby to release a preformed article M from the male and female members 21, 20, to be discussed later.

The finish-forming mold 3 has a female member 30 and a male member 31 vertically opposite thereto. The female member 30 can be vertically moved by a cylinder 32. When the female member 30 is lowered, the mold 3 is closed. The male member 31 can be vertically moved by a cylinder 33. The male member 31 can be moved from the vicinity of the bottom in the pressure chamber 1 to the outside of the pressure chamber 1 thereunder. In order to allow such movement of the male member 31, the pressure chamber 1 has in the bottom thereof an opening 16 through which the male member 31 can pass. A flange-shape annular member 17 is fitted in this opening 16 with good airtightness, while the male member 31 has fitting portion 34 which can be slidably fitted to the annular member 17. The fitting portion 34 of the male member 31 has a sealing member such as an O-ring 37b (FIG. 5) to assure airtightness in the pressure chamber 1.

A mold cavity 5 defined between the female member 30 and the male member 31 is slightly different in configuration from the mold cavity 4 of the preforming mold 2. In more detail, the mold cavity 5 of the finish-forming mold 3 is substantially identical in outer peripheral configuration to the mold cavity 4 of the preforming mold 2, but the spatial width of the mold cavity 5 is generally smaller than that of the mold cavity 4. That is, the female member 30 is substantially identical in forming portion to the female member 20, but the forming portion of the male member 31 is larger than that of the male member 21.

Figure 5:
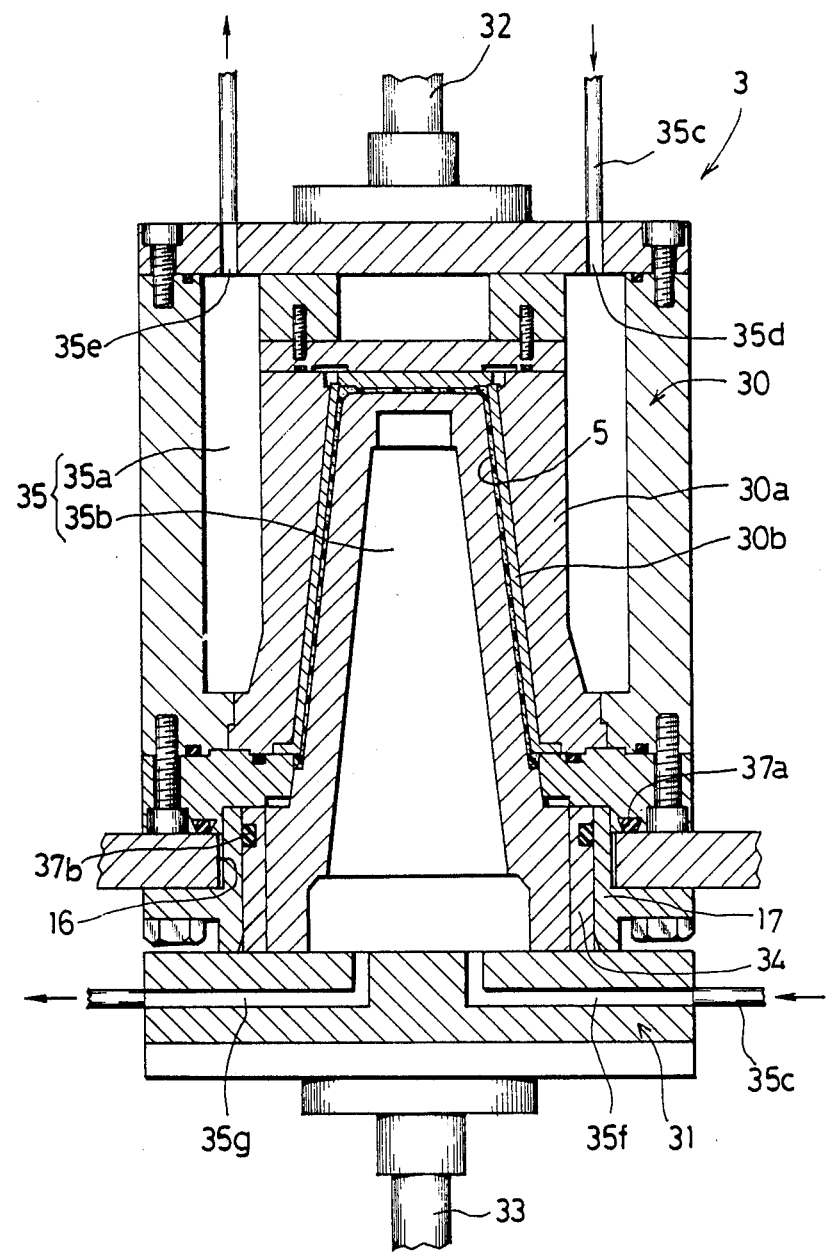
FIG. 5 is an enlarged sectional view of a finish-forming mold.

As shown in detail in FIG. 5, the female member 30 and the male member 31 have cooling means 35 for cooling a formed article in the mold cavity 5. The cooling means 35 includes a first cooling water introducing chamber 35a in the female member 30, a second cooling water introducing chamber 35b in the male member 31 and cooling water supply means (not shown) for supplying cooling water to the cooling water introducing chambers 35a, 35b through a water feed pipe 35c from the outside of the pressure chamber 1. Cooling water is always introduced into the first cooling water introducing chamber 35a through a cooling water inlet hole 35d. The cooling water introduced into the cooling water introducing chamber 35a cools the female member 30 to cool indirectly a formed article in the mold cavity 5. The cooling water introduced into the first cooling water introducing chamber 35a is discharged through a cooling water outlet hole 35e. Cooling water is always introduced into the second cooling water introducing chamber 35b through a cooling water inlet hole 35f. The cooling water introduced into the second cooling water introducing chamber 35b cools the male member 31 to cool indirectly the formed article in the mold cavity 5. The cooling water introduced into the second cooling water introducing chamber 35b is discharged through a cooling water outlet hole 35g.

The female member 30 and the male member 31 of the finish-forming mold 3 have mold-release means using air injection (not shown). With the use of air injection made from the inside of the female member 30 and the male member 31, the mold-release means may release a finished article F from the female member 30 and the male member 31, to be discussed later.

The respective female and male members may be generally made of aluminum, iron, stainless steel, brass, etc.

An expansion forming method using the forming apparatus above-mentioned, is illustrated in FIGS. 6 to 12 in the process order.

Figure 6:
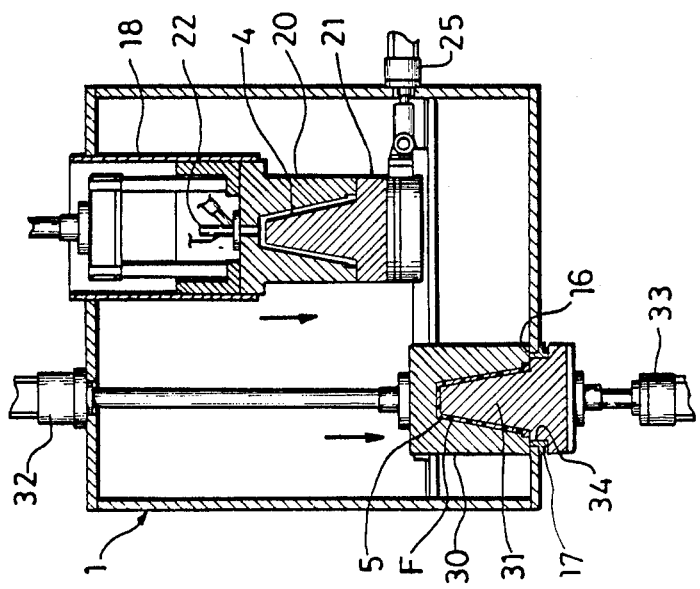

As shown in FIG. 6, the female member 20 of the preforming mold 2 is lowered from the up position shown in FIG. 1 to close the preforming mold 2. The mold cavity 4 is then defined between the female member 20 and the male member 21. The inside of the pressure chamber 1 is held as previously pressurized in a range from 0.8 to 5.0 kg/cm² gauge pressure, preferably in a range from 1.0 to 3.0 kg/cm² gauge pressure.

Figure 7:
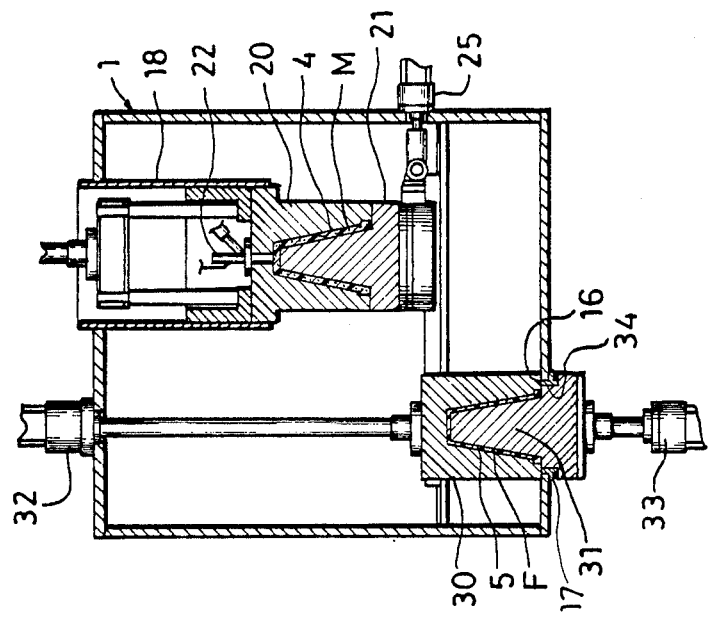

Then, as shown in FIGS. 7 and 8, the raw material feeder 22 is operated to fill the mold cavity 4 of the preforming mold 2 with beads of raw material of expandable thermoplastic resin. The beads in the mold cavity 4 are heated by the heating means 26, causing the beads to be expanded. Simultaneously with the expansion of the resin beads, the beads are fused together into a solid piece. A preformed article M is thus formed. As to the heating of the resin beads, it is preferred to heat the female member 20 to a temperature from 120° to 140° C. and the male member 21 to a temperature from 130° to 150° C. when polystyrene resin is used.

When the forming of the preformed article M is complete, the female member 20 is lifted up to open the preforming mold 2 as shown in FIG. 9.

At this time, mold-release air is blown off from the inside of the female member 20 to release the preformed article M from the female member 20. Therefore, the preformed article M remains on the male member 21.

Figure 10:
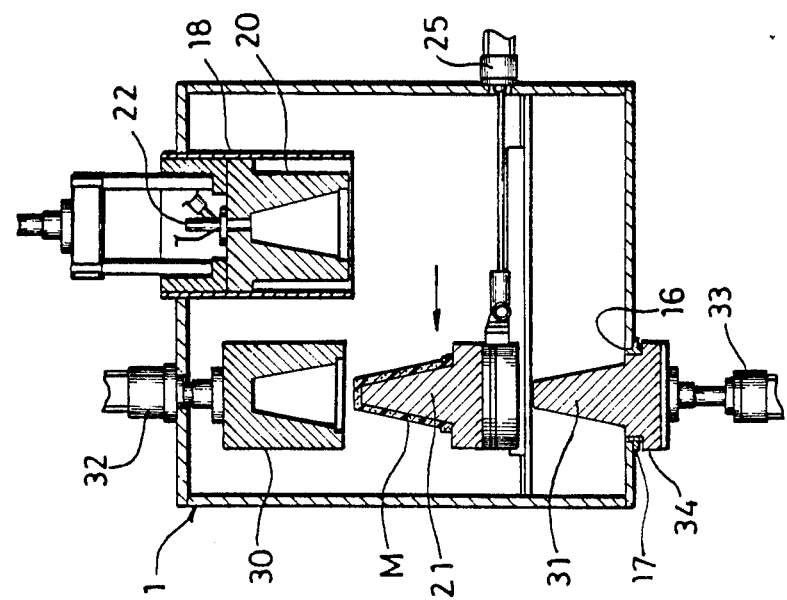

As shown in FIG. 10, the cylinder 25 is operated to horizontally move the male member 21 together with the preformed article M to the center position of the finish-forming mold 3. At this time, the female member 30 of the finish-forming mold 3 is in the up position, while the male member 31 is located at the bottom of the pressure chamber 1, so that the finish-forming mold 3 is open with the male and female members 31 and 30 separated. Then, the male member 21 of the preforming mold 2 arrives between the female member 30 and the male member 31 of the finish-formimg mold 3.

The inner pressure of the pressure chamber 1 is held higher than atmospheric pressure, thereby to restrain the preformed article M from expanding and swelling. Further, since the preformed article M is transferred as being mounted on the male member 21, such transfer can be carried out quickly.

Figure 11:
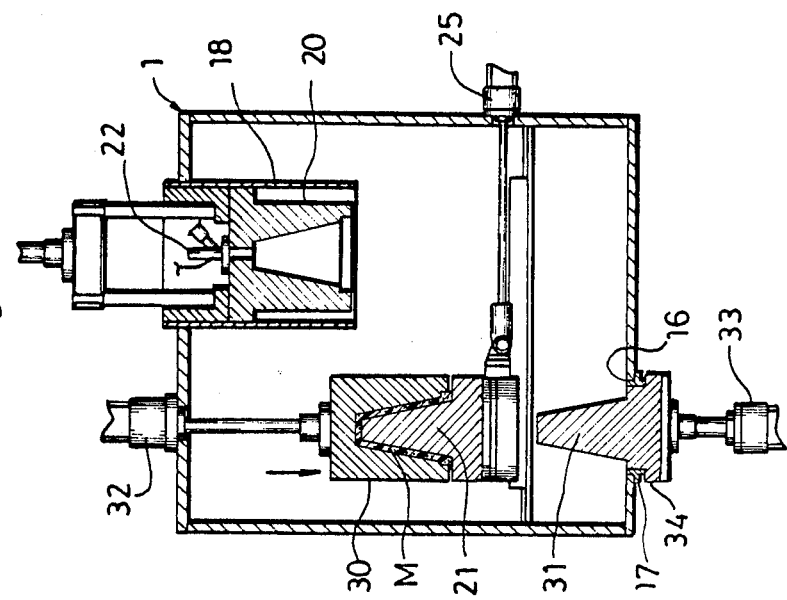
Figure 12:
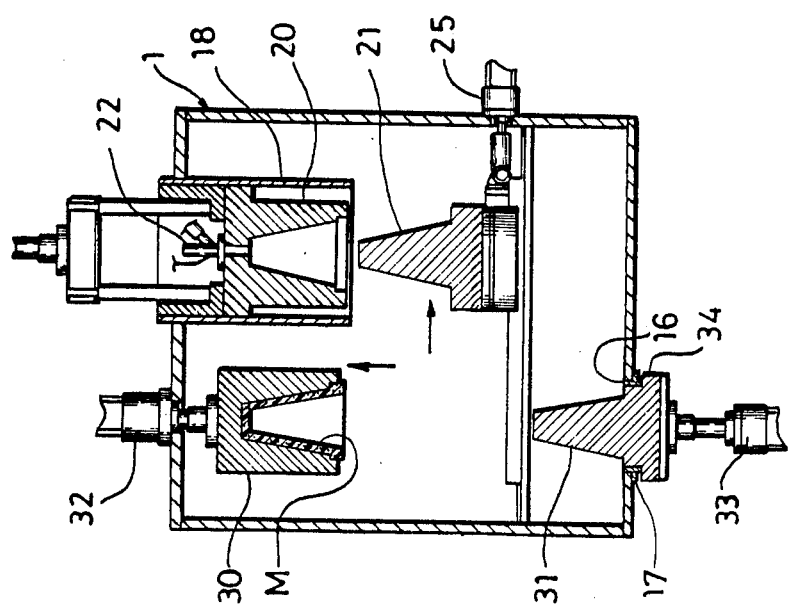

As shown in FIG. 11, the female member 30 of the finish-forming mold 3 is then lowered to cover the preformed article M remaining on the male member 21 of the preforming mold 2. The female member 30 can be easily put on the preformed article M since the same is restrained from swelling, as mentioned earlier. From the male member 21 of the preforming mold 2, air is blown off for releasing the preformed article M from the male member 21. Thus, the preformed article M is transferred to the female member 30 of the finish-forming mold 3. After the female member 30 of the finish-forming mold 3 has been moved up, the male member 21 of the preforming mold 2 is returned to the original position below the female member 20 of the preforming mold 2, as shown in FIG. 12.

Thereafter, the same heat-forming processes as above-mentioned will be repeated in the preforming mold 2. Simultaneously with these heat-forming processes, the female member 30 of the finish-forming mold 3 is lowered over the performed article M to close the mold 3 as shown in FIGS. 6 and 7. As the time of compression of the preformed article M, the article may still be in a heated condition, facilitating the compression thereof. The spatial thickness of the mold cavity 5 defined by such mold closing is smaller than the wall thickness of the preformed article M. Therefore, by closing the finish-forming mold 3, the preformed article M is compressed and formed into the configuration corresponding to the mold cavity 5 of the finish-forming mold 3. Simultaneously with such compression forming or immediately thereafter, the formed article in the mold cavity 5 of the finish-forming mold 3 is cooled to such temperature as to prevent the formed article from expanding and swelling again. A finished article F is thus obtained.

From the inside of the female member 30 of the finish-forming mold 3, air is blown off for releasing the finished article F from the female member 30. As shown in FIG. 8, after the male member 31 has been moved down under the pressure chamber 1, air is blown off from the inside of the male member 31 for releasing from the male member 31 the finished article F, which is then collected. At this time, the opening 16 on the bottom of the pressure chamber 1 is closed by the female member 30 to prevent the inner pressure of the pressure chamber 1 from decreasing. The processes of forming a cup of expanded resin are thus complete.

In order to securely close the opening 16 by the female member 30, a sealing member such as an O-ring 37a or the like is disposed at the lower end surfaces of the female member 30 (FIG. 5).

As shown in FIG. 9, the female member 30 is moved up to the upper portion of the pressure chamber 1 and, at the same time, the male member 31 is moved up to the bottom of the pressure chamber 1 to close again the opening 16 of the pressure chamber 1. Thereafter, by repeating the processes above-mentioned preformed articles M can be compressively formed in succession to produce finished articles F.

The simultaneous and continuous execution of the forming processes of preformed articles M with the preforming mold 2 and the forming processes of finished articles F with the finish-forming mold 3 may enhance the efficiency of manufacturing cups of expanded resin.

Figure 13:
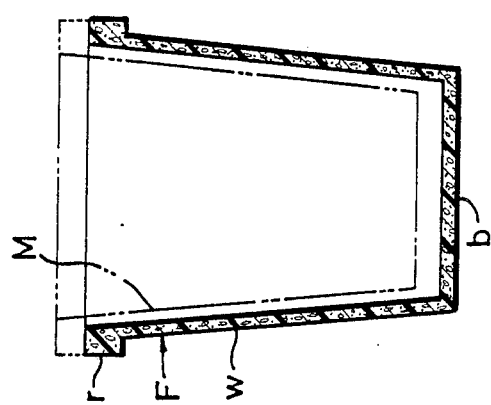
FIG. 13 is a sectional view of a finished article.

FIG. 13 shows an expansion-formed article manufactured by the forming method above-mentioned. In FIG. 13, the solid lines represent the outer configuration of the finished article F, while the two-dot chain lines represent the inner configuration of the preformed article M. The expansion-formed article illustrated is a cup to be used for drink. This cup has an upwardly flaring side wall w standing from a circular bottom b to form a substantially cylindrical and slender shape. The upper peripheral edge r of the side wall w is thicker than other portions of the cup, and projects outward.

When comparing the preformed article M formed with the performing mold 2 to the finished article F compressively formed with the finish-forming mold 3, they are identical in outer configuration to each other. However, since the male member 31 of the finish-forming mold 3 is larger than the male member 21 of the preforming mold 2, the finished article F has an inner configuration slightly larger than that of the preformed article M. Therefore, the finished article F has a wall thickness thinner than that of the preformed article M. The amount of the thickness reduced corresponds to the amount of compression forming achieved by the finish-forming mold 3. The compression forming reduces not only the thickness of the side wall w of the expansion-formed article or cup, but also the thickness of the entire cup including the bottom b and the upper peripheral edge r. The entire height of the cup as the finished article F is slightly lower than that of the preformed article M.

It is preferred to exhaust the air present between the male member 31 and the preformed article M immediately before the compression forming is carried out in the finish-forming mold 3.

Figure 14:
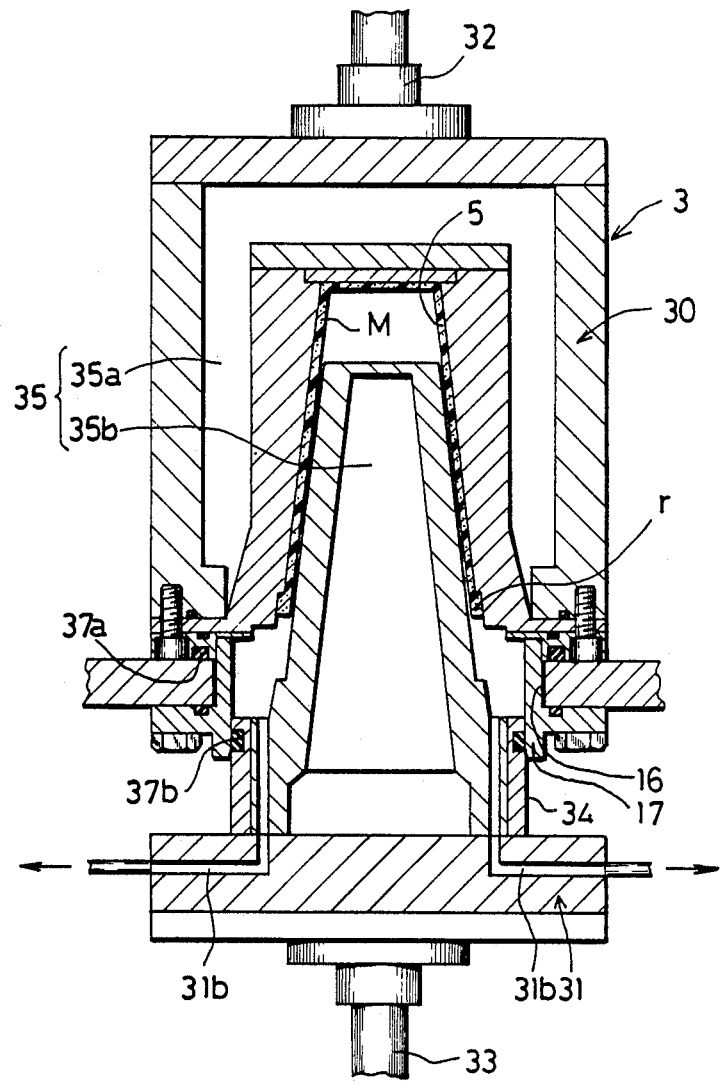
FIGS. 14 and 15 are enlarged sectional views illustrating another example of the finish-forming mold.

FIG. 14 is a section view of a finish-forming mold 3 capable of exhausting the air present between the male member 31 and the preformed article M. The structure of the finish-forming mold 3 in FIG. 14 is basically idential to that shown in FIG. 5, except for provision of an exhaust port 31b in the female member 30 for exhausting the air present between the male member 31 and the preformed article M. The exhaust port 31b communicates with a vacuum suction pump (not shown) outside of the pressure chamber 1.

To carry out the compression forming with the finish-forming mold 3 having the exhaust port 31b, the mold 3 is maintained as slightly opened as shown in FIG. 4 just before the mold 3 is finally closed, thus enabling the exhaust to the outside of the mold 3 of the air present between the male member 31 and the preformed article M. After the air present between the male member 31 and the preformed article M has been exhausted, the mold 3 is finally closed to carry out the compression forming as shown in FIG. 15.

If the finish-forming mold 3 is closed at once to compressively form the preformed article M, there is no space for the air present between the male member 31 and the preformed article M to escape. Therefore, the compression forming cannot be well carried out and the finished article F may have a surface with minute irregularities, or the upper peripheral edge r may be creased. According to the embodiment shown in FIGS. 14 and 15, however, prior to the compression forming the air present between the male member 31 and the preformed article M is exhausted to the outside of the mold 3. The compression forming can therefore be carried out without producing irregularities on the surface or creases around the upper peripheral edge r of a cup as the finished article.

Figure 15:
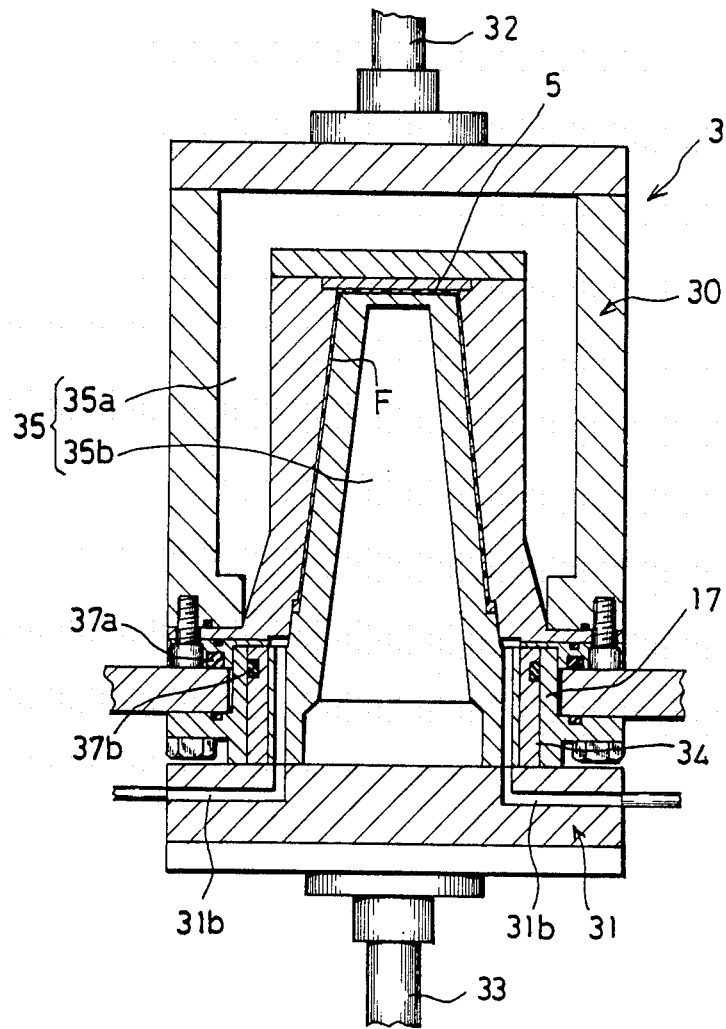

In the embodiment shown in FIGS. 14 and 15, the air present between the male member 31 and the preformed article M is forcibly exhausted to the outside of the mold 3 by vacuum suction through the exhaust port 31b. But, without the use of vacuum suction, the air present between the male member 31 and the preformed article M can be naturally exhausted to a certain degree through the exhaust port 31b when the mold 3 is closed.

Portions of the finish-forming mold 3 may be made of an air-permeable material, for example a porous material, so that the air present between the male member 31 and the preformed article M may be exhausted automatically by closing the mold or forcibly by vacuum suction.

In any of the embodiments discussed hereinbefore, the compression forming of the preformed article M with the finish-forming mold 3 has been made while cooling the preformed article M transferred from the preforming mold 2. But, a preferred step of re-heating the preformed article M may be added before the compression forming.

FIG. 16 is an enlarged section view of a finish-forming mold 3 to be used in the embodiment of such forming method. The finish-forming mold 3 includes heating and cooling means 36 for heating the preformed article M before the compression forming and cooling the same after the compression forming. The heating and cooling means 36 comprises a first space 36a in the female member 30 along the vicinity of the forming portion thereof, a second space 36b in the male member 31 along the vicinity of the forming portion thereof, and a steam/cooling-water supply means (not shown) for selectively supplying steam or cooling water to the spaces 36a and 36b through a pipe 36c from the outside of the pressure chamber 1.

When the finish-forming mold 3 having the structure above-mentioned is used, steam may be supplied to the first space 36a in the female member 30 and the second space 36b in the male member 31 before carrying out the compression forming after the preformed article M has been transferred to the finish-forming mold 3. The male and female members 31 and 30 are therefore heated to heat indirectly the preformed article M in the mold cavity 5, enabling the surface of the preformed article M to be softened and melted. As the result, a finished article having a lustrous surface can be obtained. The heating and subsequent cooling of the resin beads in the finish-forming mold is considered an important feature of the present invention. It is believed that some partial melting of the resin bead occurs, which, followed by the compression and cooling, accounts for the added smoothness and glossy, lustrous surface of the finished article F, and contributes to its appearance and marketability. After the compression forming has been completed, cooling water is supplied to the first space 36a and the second space 36b to cool the female member 30 and the male member 31 to cool indirectly the compressively formed article. The subsequent processes can be carried out in the same manner as in the embodiments mentioned earlier.

In the compression forming with the finish-forming mold 3 having the heating and cooling means 36, the female member 30 and the male member 31 are heated to a temperature from 70° to 110° C. when polystyrene resin is used. There are also disposed a drain port 36d for discharging steam and cooling water, and an inlet port 38 for mold release air.

Likewise the male member 31 shown in FIG. 14, the male member 31 of the finish-forming mold 3 in FIG. 16 has the exhaust port 31b for exhausting to the outside of the mold 3 the air present between the male member 31 and the preformed article M. With the use of this finish-forming mold 3, compression forming can be carried out without producing irregularities on the surface of a cup as a finished article and creases around the upper peripheral edge r thereof.

As to the material of the mold members used in the embodiment above-mentioned, there may be used, for the members 20 and 21 of the preforming mold 2, material having a certain strength and heat resistance such as aluminum, iron, stainless steel, brass or the like, since these members 20 and 21 are heated at all times. For the female and male members 30, 31 of the finish-forming mold 3, since heating and cooling are alternately carried out in this mold 3, there may be used material having a good thermal conduction and a small heat capacity such as thin stainless steel, a copper alloy or the like in order to accelerate the processing cycle.

Examples of the raw material of beads of expandable thermoplastic resin include homopolymers or copolymers of styrene, ethylene, propylene etc., or mixture of these polymers to which a suitable forming agent is impregnated. Generally, expandable thermoplastic resin-beads which have been pre-expanded are used.

According to the forming method above-mentioned, the pressure chamber 1 requires an inner pressure such that the preformed article M does not expand and swell. Specifically, the inner pressure of the pressure chamber 1 is in a range from 0.8 to 5.0 kg/cm$^2$ gauge pressure, although it varies depending on the material of expandable thermoplastic resin-beads to be used and the forming conditions in the preforming mold 2.

The difference in thickness between the preformed article M and the finished article F i.e. the amount of compression-forming achieved with the finish-forming mold 3 may be suitably set depending on the use, the minimum necessary thickness, the configuration and the like of a formed article which is sought to be finally obtained.

However, the thickness of the preformed article M should be such that resin beads can be introduced and heat-formed. Therefore, the thickness of the preformed article M is generally 1 mm or more. The thickness of the finished article F is determined by the above-mentioned amount of compression forming to be achieved with the finish-forming mold 3. The amount of such compression forming is not necessarily the same throughout the finished article. Taking the necessary strength or the forming configuration into consideration, different amounts of compression forming may be set to different portions of an article which is sought to be obtained. For example, when forming a cup, the amount of compression forming or the amount of reduced thickness of the bottom b and the upper peripheral edge r may be larger than that of the side wall w. As the result, the bottom b and the upper peripheral edge r of the finished article F have a relatively great strength as compared to the thickness.

Further, the amount of compression forming affects the density of the finished article F. The greater the amount of compression forming, the higher the density. It is therefore possible to produce an expansion-formed article having different densities by partially changing the amount of compression forming applied at various points to the same article.

In the forming apparatus illustrated, the raw material feeder 22 for the preforming mold 2 is disposed on the female member 20, and the entire female member 20 is slidably disposed in the guide casing 18. The raw material feeder 22 and the raw material supply pipe 60 connected thereto and the like, are disposed such that they are always located outside of the pressure chamber 1. Such arrangement facilitates the maintenance and checking of the feeder 22 and the pipe 60, and eliminates adverse effects by the heat in the pressure chamber 1. That is, if the feeder 22, the pipe 60 and the like are located in the pressure chamber 1, heating the pressure chamber 1 also heats the feeder 22, the pipe 60 and the like. Therefore, after the mold cavity 4 of the preforming mold 2 has been filled with raw material beads, portions of the raw material beads remaining in the feeder 22 and the pipe 60 are heated and therefore expanded. Such expanded beads are meltingly bonded to the feeder 22 and the pipe 60, which are, in turn, clogged. Thereafter, the raw material may not be smoothly introduced or articles may be defectively formed. Such inconveniences can be avoided by arranging the feeder 22 and the pipe 60 outside of the pressure chamber 1.

As transfer means of the preforming mold 2 and the finish-forming mold 3, there may be used hydraulic, pneumatic or electromagnetic cylinders, servo motors, rack pinions, links or the like, instead of the cylinders illustrated by reference numerals 23, 25, 32, 33. Also, the preforming mold 2 and the finish-forming mold 3 can be arranged in a manner different from that illustrated, as far as the preformed article M can be smoothly transferred between the both molds 2 and 3.

According to the forming apparatus illustrated in the drawings, one preforming mold 2 and one finish-forming mold 3 are disposed. However, a plurality of pairs of the molds 2 and 3 may also be disposed. Such arrangement in which a plurality of expanded resin cups can be manufactured at a time, may be suitable to mass production.

As to the configuration of expanded resin cups obtained by the forming apparatus in accordance with the present invention, the advantages of the invention can be achieved most efficiently for such slender and tapering cylindrical cups to be used for drink as illustrated in the drawings. However, the present invention can be applied to cups for drink and instant food having other configuration than that illustrated in the drawings.

The present invention should not be limited to the embodiments described and illustrated hereinbefore. For example, the male member 21 of the preforming mold 2 may be identical in dimensions to the male member 31 of the finish-forming mold 3, while the female member 30 of the finish-forming mold 3 may have dimensions smaller than those of the female member 20 of the preforming mold 2. Therefore, the spatial width of the mold cavity 5 of the finish-forming mold 3 may be smaller than that of the mold cavity 4 of the preforming mold 2. Besides, various modifications of the present invention may be made without departing from the spirit and principle thereof.

The following description will discuss a specific example of embodying the forming method of the invention.

Pre-expanded beads having a bulk density of 0.077 g/cm$^3$ (Eslene Beads HK manufactured by Sekisui Kaseihin Kogyo Co., Ltd.) were expanded and formed.

The tapering cylindrical cup for drink shown in FIG. 13 was formed with the use of forming apparatus having a structure described in connection with FIGS. 1 to 12, in which the air present between the male member 31 and the preformed article M was not exhausted and the finish-forming mold 3 was not heated.

There was used the preforming mold 2 having the mold cavity 4 which has such configuration as to produce a preformed article having the bottom b of 3 mm in thickness, the side wall w of 2 mm in thickness and the upper peripheral edge r of 3 mm in thickness. There was used the finish-forming mold 3 having the mold cavity 5 which has such configuration as to produce a finished article having the bottom b of 1 mm in thickness, the side wall w of 0.5 mm in thickness, and the upper peripheral edge r of 2 mm in thickness.

With the forming apparatus having such mold members, cups were formed with the inside of the pressure chamber 1 pressurized to 1.4 kg/cm$^2$ gauge pressure.

The cups thus obtained were compared to cups obtained by a conventional beads forming method.

The stacking height of the cups each of which having a thickness of 2 mm obtained by the conventional method was 20 mm, while the stacking height of the cups each of which having a thickness of 0.5 mm obtained by the method of the present invention was reduced to 5 mm. Therefore, the cost of cup transportation could be reduced by 75% i.e. to ¼ of the conventional cost. The cups obtained by the method of the present invention had no pinholes so that there is no liquid leakage in use, and have smooth and beautiful surfaces, thus proving that the advantages of the present invention are remarkable.

Then, there was used a finish-forming mold similar to that shown in FIG. 14 and the air present between the preformed formed article M and the male member 31 was forcibly exhausted by vacuum suction prior to compression forming. With the heating and cooling means added to the finish-forming mold, forming was carried out with different temperatures set in order to make sure of preferable temperatures to be set for the finish-forming mold. The relation between the temperatures and the surface conditions of the cups obtained, is shown in the following table. It is noted that other forming conditions were the same as those in the specific example mentioned earlier.

TABLE

| Temperatures Set (°C.) | | |
| --- | --- | --- |
| Female member | Male member | Surface Condition |
| 60 | 60 | bad |
| 70 | 70 | not so good |
| 80 | 80 | good |
| 90 | 90 | very good |
| 100 | 90 | very good |
| 110 | 100 | good |
| 120 | 110 | not so good |

It was confirmed from this example that the forcible exhaust of the air present between the preformed article M and the male member 31 before compression forming securely prevented the occurrence of irregularities on the surface or creases around the upper peripheral edge r of the cup.

According to the present invention described and illustrated hereinbefore, through the steps of heat-forming the preformed article M, transferring the same to the finish-forming mold 3 and compressively forming the same with the finish-forming mold 3, thin-walled formed articles having a thickness of 1 mm or less can be produced readily and efficiently by a so-called bead forming method, such production having been hitherto considered difficult. That is, in the expansion forming with the preforming mold 2, there is produced the preformed article M having a thickness thicker than that of the finished article F. Accordingly, the raw material can be introduced such that at least about two beads of the raw material are arranged in the thickness direction. Therefore, the preformed article M free from pinholes or gaps can be readily obtained. Then, the preformed article M having a shape similar to the final shape of the finished article is transferred to the finish-forming mold 3 while maintaining the preformed article M in a heated state. This shortens a period of heating time during which the preformed article M is heated in the finish-forming mold 3 as necessary. As the result, a reduced loss of energy is incurred and the forming cycle can be shortened.

Thus, the present invention enables the production of thin-walled expansion-formed articles, in a simple and speedy manner, which can even stand comparison with expansion-formed articles obtained by the sheet forming method, while still possessing the advantages of the bead forming method. The advantages of the bead forming over the sheet forming such as low manufacturing cost, high forming efficiency, accurate forming configuration, etc., can be well achieved in the present invention. In particular, there can be readily formed deep formed articles, the production of which has been hitherto considered difficult by the sheet forming method. The present invention can therefore be suitably applied to production of slender cups for drink.

When cups for drink are formed as expanded resin cups, the thin wall thickness thereof may contribute to reduction in the cup bulk at a time when the cups are stacked. The efficiency in transportation and storage of cups can therefore be greatly improved.

According to the present invention, the finished article F is obtained by compressively forming the preformed article M. This improves the strength, the surface smoothness and the printing presentation of the finished article. The preformed article M can be compressively formed throughout in good balance, thereby to assure the thickness accuracy.

Accordingly, the present invention can achieve particular advantages of manufacturing thin-walled formed articles in a short period of time with high accuracy with energy loss minimized by the bead forming method. Further, when the air present between the preformed article M and the male member 31 is removed, there is additionally noted the particular advantage to prevent the occurrence of irregularities on the surface and creases around the upper peripheral edge r of a finished cup.

What we claim is:

1. In a method of forming cups of expanded resin by disposing a preforming mold and a finish-forming mold in a pressure chamber the interior of which is held pressurized, heating beads of expandable thermoplastic resin in a mold cavity of the preforming mold, causing said beads to be expanded and fused together to produce a preformed article, transferring said preformed article to the finish-forming mold, and carrying out predetermined finishing treatment on said preformed article in the finish-forming mold to produce a finished article, the improvement comprising:
   forming the preformed article having a wall thicker than that of the finished article with the preforming mold; and
   compressively forming the preformed article to reduce the thickness thereof with the finish-forming mold after transferring the preformed article to the finish-forming mold;
   thereby producing a thin-walled finished article.

2. A method of forming cups of expanded resin according to claim 1, wherein the air present between the finish-forming mold and the preformed article is exhausted to the outside of said finish-forming mold just before the preformed article is compressively formed with said finish-forming mold.

3. A method of forming cups of expanded resin according to claim 2, wherein air present between the finish-forming mold and the preformed article is exhausted to the outside of said finish-forming mold by vacuum suction.

4. A method of forming cups of expanded resin according to claim 1, wherein said preformed article is cooled with the finish-forming mold, simultaneously with the compression forming of the same, to produce the finished article.

5. A method of forming cups of expanded resin according to claim 1, wherein the preformed article is re-heated and then compressively formed, thereafter the resultant compressed article is cooled to produce the finished article in said step of compressively forming the preformed article with the finish-forming mold.

6. An apparatus for forming cups of expanded resin comprising:
   a pressure chamber, the interior of which is pressurized;
   a preforming mold having a first mold cavity in said pressure chamber having means to introduce beads of expandable thermoplastic resin into the mold cavity;
   means to heat the beads to expand and fuse them together to produce a preformed article;
   a finish-forming mold having a second mold cavity in which predetermined finishing treatment is carried out on said preformed article, said finish-forming mold being equipped with a means for exhausting air present between the second mold cavity and the preformed article;
   a male member transferring means for transferring the male member of said preforming mold to a position aligned with said finish-forming mold cavity; and
   said first mold cavity having a spatial thickness greater than that of said second mold cavity.

7. An apparatus for forming cups of expanded resin according to claim 6, wherein said finish-forming mold is provided with an exhaust means for exhausting the air present between the preformed article and the finish-forming mold.

8. An apparatus for forming cups of expanded resin according to claim 6, wherein said female member of the preforming mold is slidably fitted in a guide casing which is adopted to pass through the wall of said pressure chamber, with the mold surface of the female member of the preforming mold exposed to the inside of the pressure chamber, and a raw material feeder for filling the mold cavity of said preforming mold with beads of expandable thermoplastic resin disposed at the back of said female member in communication with the outside of said pressure chamber.

* * * * *